(12) United States Patent
Shibata et al.

(10) Patent No.: US 7,704,380 B2
(45) Date of Patent: Apr. 27, 2010

(54) METHOD OF REMOVING SULFIDES INCLUDING HYDROGEN SULFIDE AND MERCAPTAN

(75) Inventors: Toshihiko Shibata, Iwata (JP); Syoji Fukuyama, Iwata (JP)

(73) Assignee: K•I Chemical Industry Co., Ltd., Iwata-shi (JP)

( * ) Notice: Subject to any disclaimer, the term of this patent is extended or adjusted under 35 U.S.C. 154(b) by 557 days.

(21) Appl. No.: 11/547,862

(22) PCT Filed: Apr. 5, 2005

(86) PCT No.: PCT/JP2005/006632

§ 371 (c)(1),
(2), (4) Date: Oct. 6, 2006

(87) PCT Pub. No.: WO2005/097301

PCT Pub. Date: Oct. 20, 2005

(65) Prior Publication Data

US 2007/0205140 A1    Sep. 6, 2007

(30) Foreign Application Priority Data

Apr. 7, 2004   (JP) .............................. 2004-112807

(51) Int. Cl.
*C10G 29/20* (2006.01)
*C10G 29/26* (2006.01)
*B01D 53/02* (2006.01)
*B01D 53/14* (2006.01)

(52) U.S. Cl. ..................... 208/237; 208/236; 208/241; 95/135; 95/136; 95/149

(58) Field of Classification Search ................. 208/236, 208/237, 240, 241, 250; 210/749; 95/135, 95/136, 149

See application file for complete search history.

(56) References Cited

U.S. PATENT DOCUMENTS

2003/0157051 A1 *   8/2003   Morita et al. .............. 424/76.1

FOREIGN PATENT DOCUMENTS

| EP | 0036055 A2 | * 12/1980 |
| JP | 2003 238314 | 8/2003 |
| JP | 2003 261518 | 9/2003 |

OTHER PUBLICATIONS

Legin, G. Ya., "2-Bromo-2-Nitro-1,3-Propanediol (Bronopol) and Its Derivatives: Synthesis, Properties, and Application (A Review)", Apr. 1996, Pharmaceutical Chemistry Journal, vol. 30 No. 4, pp. 273-284.*

* cited by examiner

*Primary Examiner*—Walter D Griffin
*Assistant Examiner*—Renee Robinson
(74) *Attorney, Agent, or Firm*—Oblon, Spivak, McClelland, Maier & Neustadt, L.L.P.

(57) ABSTRACT

In accordance with the present invention, a method of removing sulfide(s), which is safe, is effective over long periods at low cost, and exerts no adverse influences on the environment. The present invention relates to a method of removing sulfide(s), characterized in that a medium containing sulfide (s), including hydrogen sulfide and mercaptan(s), is allowed to come into contact with 2-bromo-2-nitropropane-1,3-diyl diacetate. Also, the present invention relates to the method, wherein the medium is a solid, liquid, or gas. In accordance with the present invention, sulfide(s), including hydrogen sulfide and mercaptan(s), can efficiently be treated so that they may be removed at low cost without the need for large-capacity equipment. In addition, the present invention can be safely practiced because there is no generation of byproducts that irritate the skin.

13 Claims, No Drawings

METHOD OF REMOVING SULFIDES INCLUDING HYDROGEN SULFIDE AND MERCAPTAN

TECHNICAL FIELD

The present invention relates to a method of removing sulfide(s), including hydrogen sulfide and mercaptan(s), from solids, liquids, and gases with the use of 2-bromo-2-nitropropane-1,3-diyl diacetate. In particular, the present invention relates to removal of sulfide(s), including hydrogen sulfide and mercaptan(s), from liquids arising through the practice of an oilfield water flooding.

BACKGROUND ART

Upon drilling for and production, transportation, storage, and treatment of crude oil, and upon storage of residual fuel oil obtained during crude oil production, highly toxic sulfides, including hydrogen sulfide and mercaptan, are often generated. Upon drilling for crude oil, a water flooding method may be employed, wherein water is injected into an oil layer such that artificial oil-discharging energy is imparted to the reservoir. Thus, the production rate is maintained, leading to an improved recovery factor. In accordance with the water flooding method wherein water is used, oil remaining in pores in an oil layer is squeezed out after a large amount of oil has been produced by primary recovery, and reservoir pressure is prevented from decreasing upon crude oil production so that it may be maintained. Hydrogen sulfide exists in such water, ground water pumped out with crude oil, crude oil per se, gas contained in such ground water, crude oil, and the like. Further, a light hydrocarbon vapor containing hydrogen sulfide may be emitted from oil well heads. Emission of uncontrolled hydrogen sulfide causes serious health problems. Therefore, it is necessary to control such vapor.

The following methods are known: methods of removing hydrogen sulfide, wherein a hindered amine such as an alkanolamine is allowed to absorb hydrogen sulfide (JP Patent Publication (Kokai) No. 62-129125 A (1987); JP Patent Publication (Kokai) No. 7-258663 A (1995); JP Patent Publication (Kokai) No. 7-258664 A (1995)); and a method for removing sulfides, wherein halonitroalkanol is used (JP Patent Publication (Kokai) No. 2-135138 A (1990)). Further, various methods utilizing adsorption effects have been suggested. Known examples of such methods are a method using activated carbon comprising microcrystalline carbon and poorly graphitized carbon (JP Patent Publication (Kokai) No. 7-214051 A (1995)) and a method using porous carriers upon which copper components are supported (JP Patent Publication (Kokai) No. 2001-123188 A). However, some alkanolamine compounds are combustible and generate an explosive gaseous mixture. Thus, it is dangerous to handle such compounds, and utilization of these compounds requires specialized equipment. In accordance with the methods described above, hydrogen sulfide is selectively removed from a gas containing hydrogen sulfide and carbon dioxide. In addition, 2,2-dibromo-2-nitroethanol (hereafter referred to as DBNE), which is a halonitroalkanol, has an effect of removing sulfides, including hydrogen sulfide and mercaptan; however, it generates unpleasant hydrogen bromide odor, which is a drawback. In addition, DBNE is highly toxic and causes very severe skin irritancy, resulting in serious problems for humans and the environment when handled. Further, 2-bromo-2-nitro-1,3-propanediol (hereafter referred to as BNP) is available at a low cost; however, it must be used in large amounts in order to exert a sufficient effect of removing sulfides. Meanwhile, an adsorption method using activated carbon or the like is readily carried out using simple equipment. However, since the method utilizes physical adsorption effects, the reaction proceeds slowly and treatment is expensive. Further, when the capacity of activated carbon deteriorates, regeneration or disposal of activated carbon is required.

DISCLOSURE OF THE INVENTION

Conventional techniques as described above are accompanied by insufficient effects of removing sulfides, including hydrogen sulfide and methyl mercaptan. Even when such effects are obtained, safety and the environment are not satisfactorily considered. The inventors of the present invention have conducted intensive studies of a method of removing sulfide(s), including hydrogen sulfide and methyl mercaptan(s). As a result, they have found that sulfide(s), including hydrogen sulfide and mercaptan(s), can efficiently be removed with the use of 2-bromo-2-nitropropane-1,3-diyl diacetate (hereafter referred to as BNPA). This has led to the completion of the present invention.

It is an objective of the present invention to provide a method of removing sulfide(s), including hydrogen sulfide and methyl mercaptan, which is effective over long periods at low cost and exerts no adverse influences on the environment.

The present invention relates to a method of removing sulfide(s), including hydrogen sulfide and methyl mercaptan, characterized in that BNPA is used.

That is, the present invention encompasses the following inventions:

(1) a method of removing sulfide(s), characterized in that a medium containing sulfide(s) is allowed to come into contact with 2-bromo-2-nitropropane-1,3-diyl diacetate in an amount effective for removing such sulfide(s);

(2) the method described in (1), wherein the medium is a solid, liquid, or gas; and (3) the method described in (1), wherein the sulfide(s) is (are) hydrogen sulfide or mercaptan(s).

In accordance with the present invention, sulfide(s), including hydrogen sulfide and mercaptan(s), can efficiently be treated so that they may be removed at low cost without the need for large-capacity equipment. In addition, the present invention can be safely practiced because there is no generation of byproducts that irritate the skin. Further, since no heavy metal salts are used in the present invention, treated matter from which sulfide(s) have been removed can be disposed of or incinerated without concern about environmental influences.

This description includes part or all of the contents as disclosed in the description of Japanese Patent Application No. 2004-112807, which is a priority document of the present application.

BEST MODE FOR CARRYING OUT THE INVENTION

BNPA used in the present invention can be obtained by allowing acetyl chloride to react with 2-bromo-2-nitropropane-1,3-diol.

In accordance with the method of removing sulfide(s) of the present invention, the use form of BNPA is not particularly limited when BNPA is allowed to come into contact with a medium containing or generating sulfide(s), including hydrogen sulfide and methyl mercaptan, in the form of solid matter, liquid matter, or gaseous matter. Thus, BNPA alone may be used. In addition, a liquid formulation obtained by adding a diluent such as a solvent to BNPA can be used. Also, it is possible to add BNPA to a medium to be treated by injecting or simply pouring BNPA thereinto. In such case, it is possible to uniformly disperse BNPA in a fluid by stirring the medium or by other methods according to need. Further, it is also possible to use BNPA in a manner such that adsorbents or porous carriers that are suitable for the purpose of the present invention are filled with BNPA. Furthermore, in accordance with the present invention, a BNPA solution can be subjected to bubbling with a gas containing sulfide(s).

Examples of such solvent that can be used include glycols such as diethylene glycol, polyethylene glycol 200, propylene glycol, dipropylene glycol, and polypropylene glycol; glycol ethers such as ethylene glycol monomethyl ether, diethylene glycol monoethyl ether, and dipropylene glycol monomethyl ether; aprotic polar solvents such as N,N-dimethyl acetamide, N-methyl-2-pyrrolidinone, 2-pyrrolidinone, dimethyl sulfoxide, propylene carbonate, γ-butyrolactone, sulfolane, dimethyl maleate, dimethyl adipate, dimethyl succinate, and dimethyl glutarate; and other alcohols. These solvents can be used alone or in combinations of two or more. Further, a surfactant can be added thereto.

The concentration of BNPA used in the method of the present invention depends on the sulfide concentration in the medium. BNPA having the concentration that is required for the removal of sulfide(s) may be used. For instance, when the medium to be treated is a liquid or gas, the concentration of BNPA used relative to the total amount of the medium is about 2 to 5000 ppm, preferably about 10 to 1000 ppm, more preferably 50 to 1000 ppm, and further preferably not less than 100 ppm.

The method of the present invention involves the use of known sulfide adsorbents, sulfide removers, sulfide removal methods, and/or sulfide removal apparatuses unless they adversely influence the method of the present invention. Examples of known sulfide adsorbents or removers include, but are not limited to, 1,2-benzenedicarbo aldehyde (OPA), 1,5-pentanedial (GDA), and halonitroalkanol.

In accordance with the method of the present invention, a typical example of the medium to be treated is a solid, liquid, or gas containing or generating sulfide(s), including hydrogen sulfide and mercaptan(s). Specific examples thereof include treated water generated during petroleum drilling or an oilfield water flooding, ground water pumped out with crude oil, crude oil per se, gas existing with such ground water or crude oil, and light hydrocarbon vapor containing hydrogen sulfide that is emitted from oil well heads and the like. In addition, the method of the present invention can be applied to the removal of sulfide(s), including hydrogen sulfide and mercaptan(s), contained in a liquid or gaseous hydrocarbon containing hydrogen sulfide, such as gas that is emitted upon production, transportation, and purification of natural gas or crude oil. The method of the present invention is not limited thereto. Thus, the method of the present invention can be used for the removal of sulfide(s) contained in household wastewater, industrial wastewater, sewage, human waste, activated sludge generated during sludge treatment steps in facilities where the aforementioned waste water and the like are treated, sludge remaining after treatment using wastewater treatment equipment or the like, concentrated sludge, dewatered sludge, and the like. An example of such medium is sludge cake.

EXAMPLES

The present invention is hereafter described in more detail with reference to the following formulation examples and test examples, although the technical scope of the present invention is not limited thereto.

Formulation Example 1

BNPA (30 g) and propylene carbonate (70 g) were mixed together such that a liquid formulation was obtained.

Formulation Example 2

DBNE (30 g) and dimethyl succinate (70 g) were mixed together such that a liquid formulation was obtained.

Test Example 1

Two 200-ml four-neck flasks were provided. Hexane (100 ml) was placed in the flask equipped with a bubbling device. In the other flask, iron sulfide underwent a reaction with the dropwise addition of hydrochloric acid, resulting the generation of hydrogen sulfide. Then, hexane was subjected to bubbling with hydrogen sulfide that had been transferred via a tube. Thus, test samples at a hydrogen sulfide concentration of 100 ppm were prepared. The measurement of hydrogen sulfide concentration was carried out by FPD gas chromatography (using a flame photometric detector). Stock solution of BNPA, DBNE, and BNP (100 ppm each) were separately added to the test samples, followed by stirring for a given period of time. The hydrogen sulfide concentration of each sample was measured in a time-dependent manner. The results are shown in table 1.

TABLE 1

| Compound | Contact time (minutes) | Test sample A Hydrogen sulfide concentration (ppm) |
|---|---|---|
| BNPA | 0 | 100 |
|  | 10 | 38 |
|  | 30 | 14 |
|  | 60 | 2 |
| DBNE | 0 | 100 |
|  | 10 | 42 |
|  | 30 | 25 |
|  | 60 | 11 |
| BNP | 0 | 100 |
|  | 10 | 81 |
|  | 30 | 77 |
|  | 60 | 68 |
| Untreated | 0 | 100 |
|  | 10 | 97 |
|  | 30 | 97 |
|  | 60 | 95 |

Table 1 shows that BNPA and DBNE had an effect of removing hydrogen sulfide. In addition, BNPA achieved the removal of hydrogen sulfide in a very short time compared with DBNE. On the other hand, BNP was also confirmed to have an effect of removing hydrogen sulfide; however, the removal efficiency was poor.

Test Example 2

A formulation containing BNPA was previously prepared in accordance with Formulation example 1. With the use of DBNE and BNP instead of BNPA, formulations containing DBNE and BNP, respectively, were prepared, in accordance with formulation example 1. Each formulation (1 ml) was dispensed into a glass petri dish covered with a plastic bag. Then, each plastic bag was closed after being filled with methyl mercaptan gas at 500 ppm. The methyl mercaptan gas was allowed to come into contact with the formulation for a given time. Thereafter, the methyl mercaptan gas concentration was measured using a detector tube. The results are shown in table 2.

TABLE 2

| Compound | Contact time (hours) | Methyl mercaptan gas concentration (ppm) |
|---|---|---|
| BNPA | 0 | 500 |
|  | 24 | 283 |
|  | 48 | 0 |
| DBNE | 0 | 500 |
|  | 24 | 358 |
|  | 48 | 29 |
| BNP | 0 | 500 |
|  | 24 | 485 |
|  | 48 | 461 |
| Untreated | 0 | 500 |
|  | 24 | 494 |
|  | 48 | 486 |

Table 2 shows that the complete removal of methyl mercaptan gas was achieved after 48 hours with the use of BNPA of the present invention. Also, DBNE was confirmed to have the effect of removing methyl mercaptan; however, the level of the effect was lower than that in the case of BNPA. In addition, BNP showed almost no effect of removing methyl mercaptan.

Test Example 3

Distilled water was bubbled with hydrogen sulfide gas. Thus, a hydrogen sulfide-dissolved solution (5 mgS/l) was prepared. The solution was placed in separate beakers. Then, formulations that were prepared in accordance with Test example 2 were separately added thereto in a manner such that the concentration of each test compound became 500 ppm, followed by stirring for 10 minutes. Thereafter, the residual hydrogen sulfide concentration was measured. The measurement was carried out using "Pack Tests" (Kyoritsu Chemical-Check Lab., Corp.) in accordance with a methylene blue colorimetric method. The results are shown in table 3.

TABLE 3

| Compound | Residual hydrogen sulfide concentration (mgS/l) |
|---|---|
| BNPA | ND |
| DBNE | 5 |
| BNP | 18 |
| Untreated | 23 |

Table 3 shows that the complete removal of hydrogen sulfide that had been dissolved in water was achieved with the use of BNPA. DBNE as a comparative example was also confirmed to have an effect of removing hydrogen sulfide. However, with the use of DBNB, such complete removal was not achieved. Meanwhile, BNP was confirmed to have a very low capacity for removing hydrogen sulfide.

Test Example 4

A formulation containing BNPA was previously prepared in accordance with Formulation example 1. With the use of BNP instead of BNPA, a formulation containing BNP was prepared in accordance with formulation example 1.

Iron sulfide and hydrochloric acid were allowed to react with each other, resulting in the generation of hydrogen sulfide. Thus, hydrogen sulfide gas at a concentration of 500 ppm was prepared. Each formulation (1 ml) was placed in a glass petri dish covered with a plastic bag. Then, each plastic bag was closed after being filled with 1 liter of hydrogen sulfide gas. At 24 and 48 hours later, the hydrogen sulfide gas concentration was measured using a detector tube. The results are shown in table 4.

TABLE 4

| Compound | Contact time (hours) | Hydrogen sulfide concentration (ppm) |
|---|---|---|
| BNPA | 0 | 500 |
|  | 24 | 210 |
|  | 48 | 0 |
| BNP | 0 | 500 |
|  | 24 | 480 |
|  | 48 | 470 |
| Untreated | 0 | 500 |
|  | 24 | 490 |
|  | 48 | 480 |

Table 4 shows that the complete removal of hydrogen sulfide was achieved after 48 hours with the use of BNPA of the present invention. On the other hand, with the use of BNP as a comparative example, complete removal was not achieved.

Test Example 5

Distilled water was bubbled with a hydrogen sulfide gas. Thus, a solution containing dissolved hydrogen sulfide (5 mgS/l) was prepared. The solution was placed in separate beakers. Then, formulations that were prepared in accordance with Test example 4 were separately added thereto in a manner such that the concentration of each test compound became 500 ppm, followed by stirring for 30 minutes using a stirrer. Thereafter, the residual hydrogen sulfide concentration was measured. The measurement was carried out using "Pack Tests" (Kyoritsu Chemical-Check Lab., Corp.) in accordance with a methylene blue colorimetric method. The results are shown in table 5.

TABLE 5

| Compound | Residual hydrogen sulfide concentration (mgS/l) |
|---|---|
| BNPA | ND |
| BNP | 1 |
| Untreated | 1 |

Table 5 shows that residual hydrogen sulfide was observed in the cases of the compound containing BNP and the untreated compound; however, no hydrogen sulfide was observed in the case of the compound containing BNPA.

All publications, patents, and patent applications cited herein are incorporated herein by reference in their entirety.

INDUSTRIAL APPLICABILITY

The present invention is useful for removal of sulfide(s), including hydrogen sulfide and mercaptan(s), contained in or generated from solid matter, liquid matter, or gaseous matter. The method of the present invention can be used in the practice of petroleum drilling, the oilfield water flooding, and the like.

The invention claimed is:

1. A method of removing sulfide(s), characterized in that a medium containing sulfide(s) is allowed to come into contact with 2-bromo-2-nitropropane-1,3-diyl diacetate in an amount effective for removing such sulfide(s), and wherein the sulfide(s) is (are) hydrogen sulfide or methyl mercaptan,
   wherein (a) the medium is a gas or (b) wherein the medium is a liquid or gaseous hydrocarbon.

2. The method of claim 1, wherein the sulfide is hydrogen sulfide.

3. The method of claim 1, wherein the sulfide is methyl mercaptan.

4. The method of claim 1, wherein the 2-bromo-2-nitropropane-1,3-diyl diacetate is injected or poured directly into the medium.

5. The method of claim 1, wherein a porous carrier containing the 2-bromo-2-nitropropane-1,3-diyl diacetate is added to the medium.

6. The method of claim 1, wherein an adsorbent containing the 2-bromo-2-nitropropane-1,3-diyl diacetate is added to the medium.

7. The method of claim 1, wherein the 2-bromo-2-nitropropane-1,3-diyl diacetate is diluted in a solvent, which is added to the medium.

8. The method of claim 1, wherein the medium contains about 2 to 5000 ppm of the 2-bromo-2-nitropropane-1,3-diyl diacetate.

9. The method of claim 1, wherein the medium contains about 10 to 1000 ppm of the 2-bromo-2-nitropropane-1,3-diyl diacetate.

10. The method of claim 1, wherein the medium contains about 50 to 1000 ppm of the 2-bromo-2-nitropropane-1,3-diyl diacetate.

11. The method of claim 1, wherein medium contains not less than 100 ppm of the 2-bromo-2-nitropropane-1,3-diyl diacetate.

12. The method of claim 1, wherein the medium is a gas.

13. The method of claim 1, wherein the medium is a liquid or gaseous hydrocarbon.

* * * * *